United States Patent
Huang et al.

(10) Patent No.: US 11,947,134 B2
(45) Date of Patent: Apr. 2, 2024

(54) DEVICE OF GENERATING 3D LIGHT-FIELD IMAGE

(71) Applicant: National Taiwan University, Taipei (TW)

(72) Inventors: Jiun-Woei Huang, Taipei (TW); Chang-Le Liu, Taipei (TW); Hong-Ming Chen, Taipei (TW); Kuang-Tsu Shih, New Taipei (TW)

(73) Assignee: National Taiwan University, Taipei (TW)

( * ) Notice: Subject to any disclaimer, the term of this patent is extended or adjusted under 35 U.S.C. 154(b) by 141 days.

(21) Appl. No.: 17/155,157

(22) Filed: Jan. 22, 2021

(65) Prior Publication Data

US 2022/0236584 A1   Jul. 28, 2022

(51) Int. Cl.
*G02B 30/10* (2020.01)
*G02B 27/30* (2006.01)

(52) U.S. Cl.
CPC ............ *G02B 30/10* (2020.01); *G02B 27/30* (2013.01)

(58) Field of Classification Search
CPC ............ G02B 27/01; G02B 27/0101; G02B 2027/0112; G02B 2027/0132; G02B 2027/0134; G02B 2027/014; G02B 2027/0141; G02B 27/017; G02B 27/0172; G02B 30/10; G02B 27/30
USPC ...................................................... 359/462
See application file for complete search history.

(56) References Cited

U.S. PATENT DOCUMENTS

| | | | |
|---|---|---|---|
| 2005/0179868 A1* | 8/2005 | Seo | H04N 13/322 348/E13.032 |
| 2013/0286053 A1* | 10/2013 | Fleck | G09G 3/3208 345/82 |
| 2015/0049390 A1* | 2/2015 | Lanman | G09G 3/003 359/622 |
| 2015/0262424 A1* | 9/2015 | Tabaka | G02B 27/0075 345/633 |

(Continued)

FOREIGN PATENT DOCUMENTS

| | | |
|---|---|---|
| CN | 112083575 A | 12/2020 |
| JP | 2014041281 A | 3/2014 |

(Continued)

OTHER PUBLICATIONS

"High Tech Art: Chameleon Glass" 1993, <<http://hdl.handle.net/hdl:2060/20020080952>>, (Year: 1993).*

(Continued)

*Primary Examiner* — Jade R Chwasz
(74) *Attorney, Agent, or Firm* — Demian K. Jackson; Jackson IPG PLLC

(57) ABSTRACT

A device is provided to generate a three-dimensional (3D) real image. A display panel is divided into several sub-areas for emitting scenes. Through a projecting lens-array unit, the scenes enter a fusion lens unit to form a real image of light field at a position beyond common barrier. Through an eyepiece unit, the image is emitted to human eye. Thus, the present invention provides a device for near-eye viewing, which reduces existing human-eye vergence accommodation conflict (VAC) in most augmented reality and mixed reality devices. Therein, the display of near-eye light field is a process of light-field reproduction, which merges the scenes and reduces aberration.

15 Claims, 7 Drawing Sheets

(56) References Cited

U.S. PATENT DOCUMENTS

| | | |
|---|---|---|
| 2016/0011419 A1 | 1/2016 | Gao |
| 2018/0003999 A1 | 1/2018 | Minano et al. |
| 2018/0024355 A1 | 1/2018 | Gao et al. |
| 2018/0210208 A1* | 7/2018 | Zhou .................. G02B 27/1026 |
| 2019/0025590 A1* | 1/2019 | Haddick ................ G02B 27/14 |
| 2019/0064526 A1* | 2/2019 | Connor ................ G02B 6/0073 |
| 2019/0346609 A1 | 11/2019 | Eisenfeld |
| 2020/0166734 A1 | 5/2020 | Chung |
| 2020/0301147 A1 | 9/2020 | Klug |
| 2021/0014473 A1 | 1/2021 | Hua et al. |

FOREIGN PATENT DOCUMENTS

| | | | |
|---|---|---|---|
| JP | 2015179245 A | | 10/2015 |
| JP | 2015215464 A | | 12/2015 |
| JP | 2020514810 A | | 5/2020 |
| KR | 20160093039 A | * | 8/2016 |
| WO | WO 2020042605 A1 | | 5/2020 |
| WO | WO 2020139752 A1 | | 7/2020 |
| WO | WO 2020176783 A1 | | 9/2020 |

OTHER PUBLICATIONS

Taiwan Office Action dated Mar. 28, 2022.
Huang Light field displays for near eye VR and AR., Current Developments in Lens Design and Optical Engineering XXI Aug. 21, 2020 (vol. 11482, p. 114820C). International Society for Optics and photonics https://www.spiedigitallibrary.org/conference-proceedings-of-spie/11482/2568379/Light-field-displays-for-near-eye-VR-and-AR/10.1117/12.2568379.short?SSO=1.

* cited by examiner

DEVICE OF GENERATING 3D LIGHT-FIELD IMAGE

TECHNICAL FIELD OF THE INVENTION

The present invention relates to generating light field; more particularly, to near-eye viewing, which reduces existing vergence accommodation conflict (VAC) to human eye in most augmented reality (AR), virtual reality (VR), and mixed reality (MR) devices.

DESCRIPTION OF THE RELATED ARTS

In recent years, virtual reality (VR) or augmented reality (AR) devices like Google Glasses, Vive, Oculus Rift, etc. are all based on the principle of stereo vision to produce three-dimensional (3D) perception. One of the reasons why it is difficult to acquire popularity is due to the distance to displays. With short eye-relief, human eye would be uncomfortable for long-term viewing. Similarly, since the natural divergence of the eyes does not change adjustment, it leads to the well-known conflict of integration. It means that vergence accommodation conflict (VAC) will make the viewer feel sick after using the device for a long time.

A US patent 2020/0166734 A1 proposes a head-mounted display device with a near-eye light-field display device. The proposed near-eye light-field display device is equipped with a double telecentric lens unit to greatly improve the image quality of the near-eye light-field display device. However, the sizes of its panel and optical device are too big to be realized in conformity to the current human engineering size of VR and AR. Another U.S. Pat. No. 7,620,309 B2 proposes a plenoptic camera, which obtains four-dimensional light field by inserting a microlens array between a main lens and a photosensitive device. Before gathering light rays on the photosensitive device, the microlens array placed in front of the photosensitive device can separate the travel routes of the light rays. If there is no such microlens array, every light ray in the light field will be gathered and displayed on the photosensitive device. But, a summing process would lose the angular information in the light field during a sampling process of camera.

For cooperating with VR projectors and with the development of other visual devices for version 4.0 of industrial human-machine interface, real-world multi-field display applications of pseudo-eye expansion begin to be developed as their market scales are taking off. For improving the applications of light field imaging on retina in AR and VR, the comprehensive display information on retina has to be further enhanced concerning the immersive quality of image for realizing the practicality and popularization of light field vision. Hence, the prior arts do not fulfill all user's requests on actual use.

SUMMARY OF THE INVENTION

The main purpose of the present invention is to regard near-eye light-field display as a process of light-field reproduction, where an eyepiece unit merges a plurality of scenes outputted by the device with aberration reduced.

To achieve the above purpose, the present invention is a light-field generating device, where the device displays near-eye light field; the device comprises a display panel, a projecting lens-array unit, and a fusion lens unit; the display panel is divided into a plurality of sub-areas; each of the sub-areas displays light-field information at each field angle; a plurality of scenes are emitted at a position beyond common diaphragm from the sub-areas of the display panel through the projecting lens-array unit; light rays passing through the projecting lens-array unit are displayed on an imaging plane to form a three-dimensional real image of light field; and the real image emits into eye pupil through an eyepiece unit to be displayed on retina and perceived as being emitted from an almost infinitely far-off place. Accordingly, a novel light-field generating device is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

Figure 1:
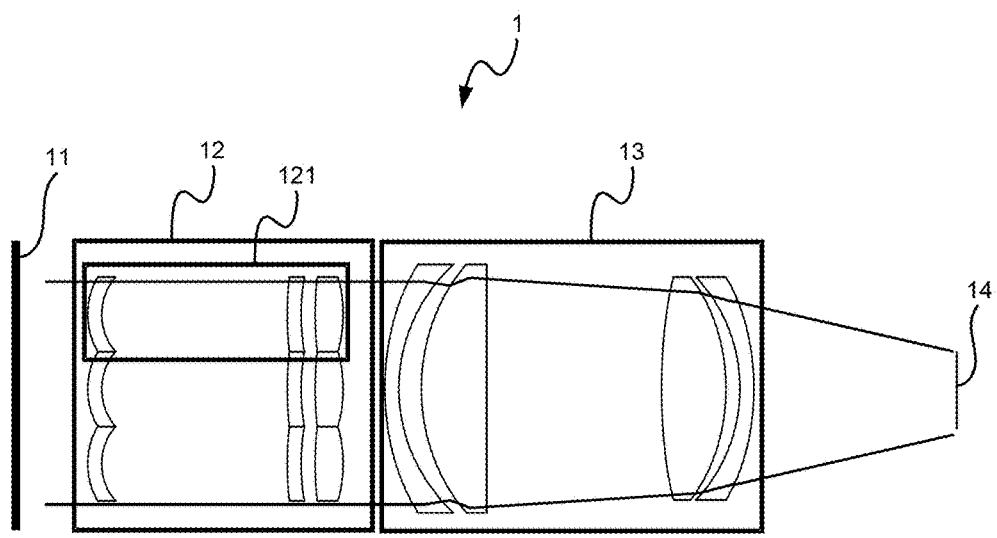
FIG. 1 is the structural view showing the preferred embodiment according to the present invention.
Figure 2:
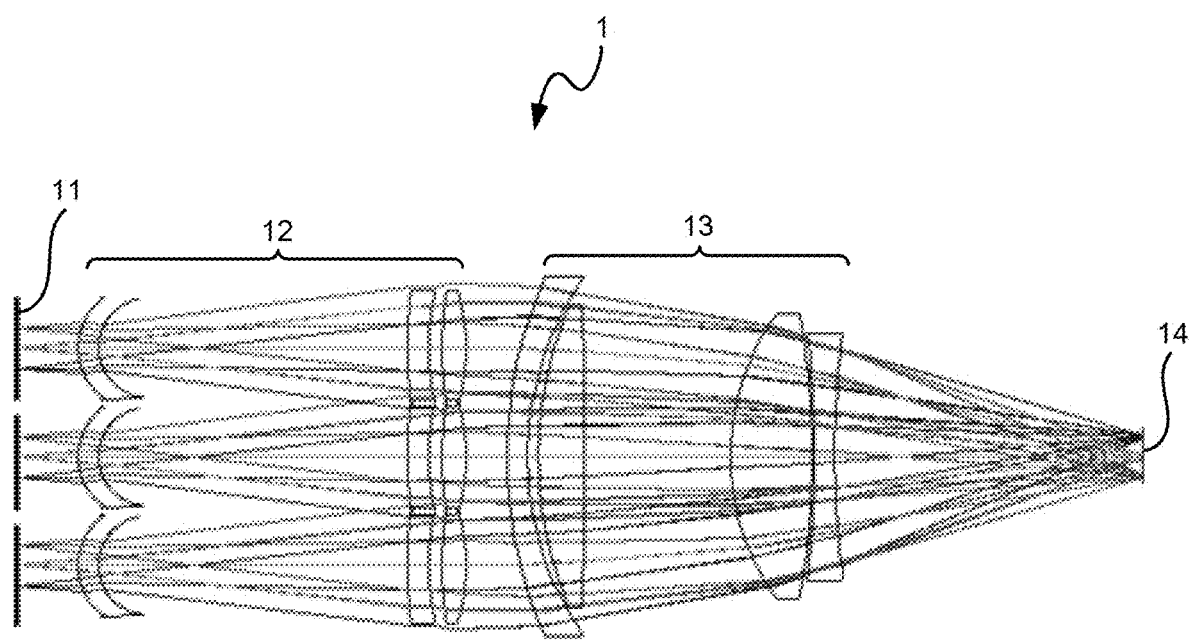
FIG. 2 is the view showing the light path.

The following description of the preferred embodiment is provided to understand the features and the structures of the present invention.

Please refer to FIG. 1 to FIG. 7, which are a structural view showing a preferred embodiment according to the present invention; a view showing light path; a view showing MTF; a view showing third-order aberration; a structural view showing a VR application of the present invention; a view showing the VR application; and a structural view showing an AR application. As shown in the figures, the present invention is a light-field generating device 1, comprising a display panel 11, a projecting lens-array unit 12, and a fusion lens unit 13, where light rays are displayed on an imaging plane 14. Therein, the display panel 11 is divided into a plurality of sub-areas for emitting a plurality of scenes. Through the projecting lens-array unit 12, the scenes enter the fusion lens unit 13 to form a three-dimensional (3D) real image of light field at a position beyond common barrier; and the real image is emitted into eye pupil through an eyepiece unit.

For verifying the design and checking the light-field quality perceived by user, the present invention uses an optical design software 'CodeV' to practice the light-field generating device 1 with simulation result checked. The light-field generating device 1 in FIG. 1 makes the main light rays at all field angles approximated on the imaging plane 14 in FIG. 2. In a simulation, the present invention uses several eye models and simulates the deformations of eyepiece by adjusting the parameters of the eye models for refocusing. For checking the clarity of the light field displayed, the present invention analyzes the modulation transfer function (MTF) in FIG. 3. According to the studies of human visual perception using letters as test patterns, the letter vision of human eye is 5 arc minutes (arcmin).

Figure 3:
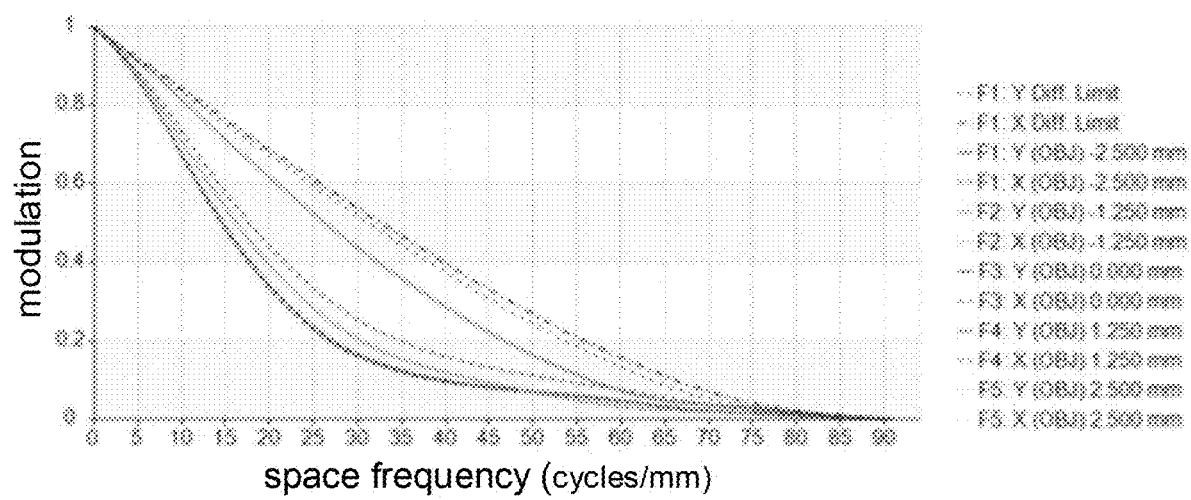
FIG. 3 is the view showing the modulation transfer function (MTF)

In the preferred embodiment, the diameter of eyeball is about 17 millimeters (mm), and the size of a 5-arcmin image on retina is about 25 microns (μm). Hence, it takes at least 20 cycles per millimeter (cycles/mm) to resolve a letter. In FIG. 3, under 20 cycles/mm, the present invention reaches 30% in the MTF. Thus, the light field displayed has an effect of clearness, an effect of good distance, and a deep field-focus.

Figure 4:
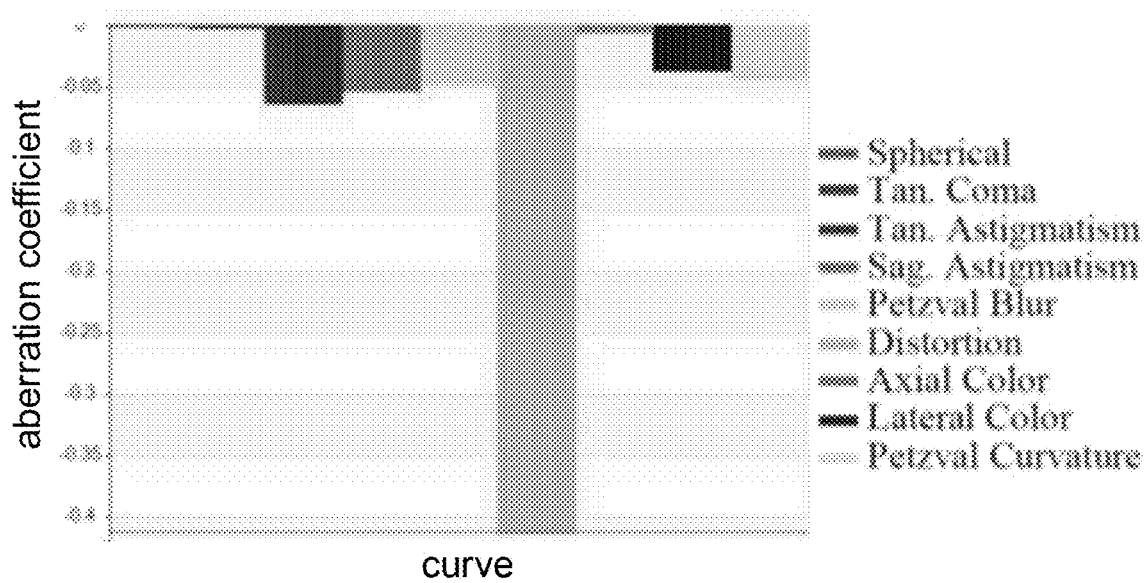
FIG. 4 is the view showing the third-order aberration.

Furthermore, an analysis of third-order aberration is shown in FIG. 4. By comparing the third-order aberrations of the present invention and the eye models, it is found that the eyepiece unit reduces the aberrations of the light-field generating device 1 to a level similar to those of the eye models, where only deformations exist in various field angles. It is also found in FIG. 4 that the degrees of deformations are relatively high due to the curvature of retina, where the deformations are in fact an important effect of light fusion. In another word, the present invention achieves good effects.

Figure 5:
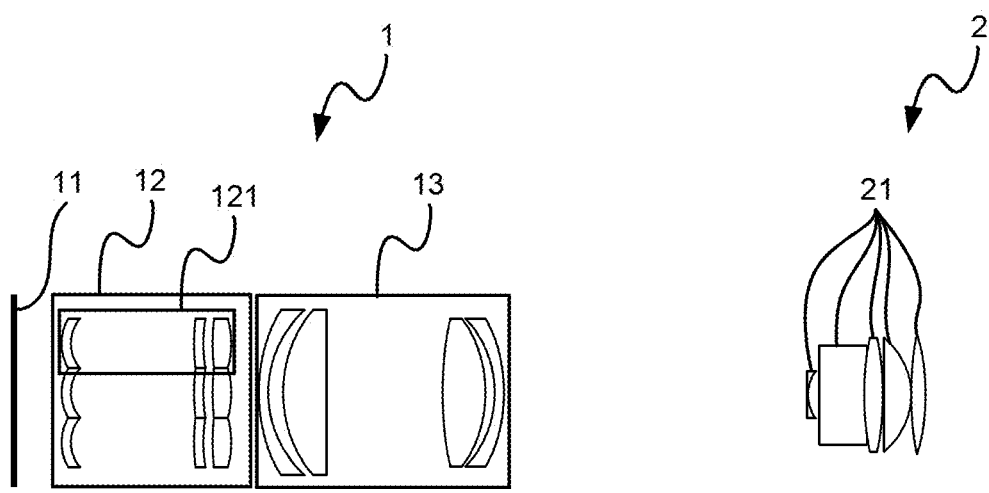
FIG. 5 is the structural view showing the virtual-reality (VR) application of the present invention.
Figure 6:
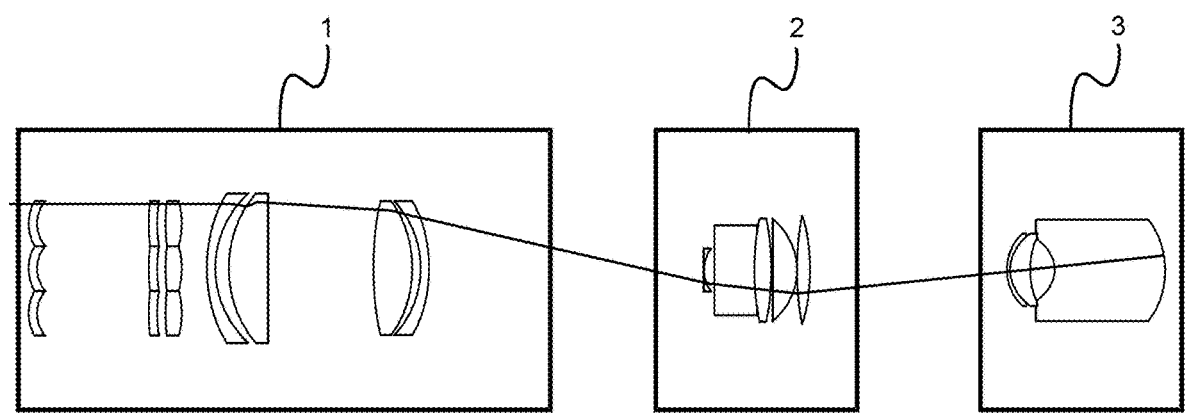
FIG. 6 is the view showing the VR application.

In a state-of-use, the present invention proposes the light-field generating device 1 for near-eye light-field display, where the light-field generating device 1 uses the eyepiece unit 2 as a light-field lens with its structure shown in FIG. 5 and FIG. 6.

The light-field generating device 1 comprises the display panel 11, the projecting lens-array unit 12, and the fusion lens unit 13. The display panel 11 is divided into a plurality of sub-areas. The projecting lens-array unit 12 is a collimating lens array, where the collimating lens array comprises an array of collimating lenses 121; the number of the collimating lenses 121 is related to the number of the sub-areas of the display panel 11; and each of the collimating lenses 121 comprises a plurality of lenses. The fusion lens unit 13 is a lens unit fusing and focusing images. Therein, a distance between the display panel 11 and the collimating lens array and a distance between the collimating lens array and the focusing lens unit are related to a focal length of the collimating lens array and a focal length of the focusing lens unit; and an f-number constructed with the projecting lens-array unit 12 and the fusion lens unit 13 is between 2 and 10.

On applying to AR, VR, and mixed reality (MR), the light-field generating device 1 projects the light field; and, after passing through the eyepiece unit 2, a collimated near-eye light field is shown to human eye. Therein, each of the sub-areas of the display panel 11 in the light-field generating device 1 shows information of the light field at each field angle. The collimating lens 121 of the projecting lens-array unit 12 collimates the light rays emitted into parallel light rays from the display panel 11. The fusion lens unit 13 then converges the light rays passing through the projecting lens-array unit 12 on an imaging plane 14. In the state-of-use, any one of the sub-areas of the display panel 11 displays a designated one of the scenes on the imaging plane 14. The scenes of the sub-areas of the display panel 11 are displayed on the imaging plane 14 and overlapped with each other. When the images on the sub-areas are all the same, the scenes emitted on the imaging plane 14 are overlapped and approximated with each other. Furthermore, the display panel 11 can be a laser beam scanner.

After passing through the eyepiece unit 2 which comprises a plurality of lenses 21, the light rays emitted by the light-field generating device 1 enter eye pupil 3, where the image projected by the light-field generating device 1 is projected on retina and perceived as being emitted from an almost infinitely far-off place.

Figure 7:
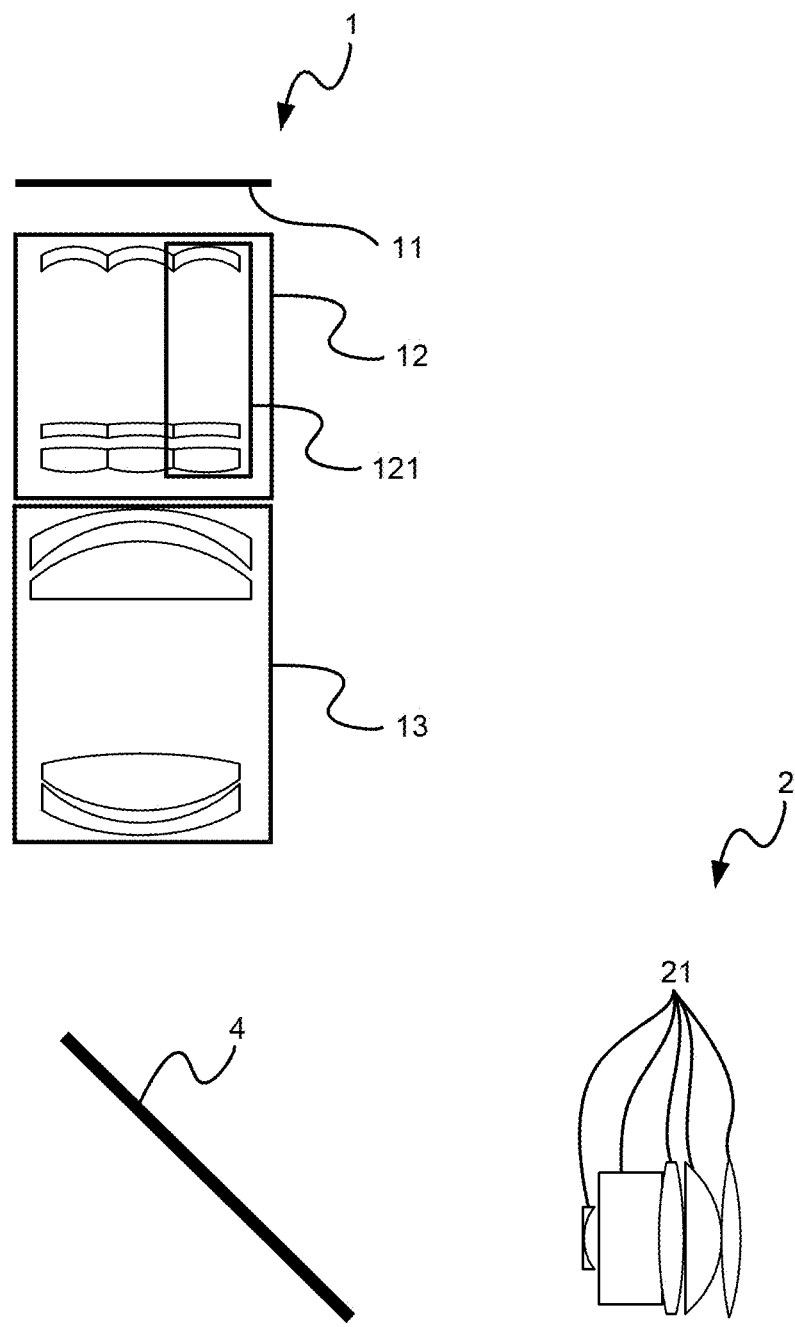
FIG. 7 is the structural view showing the augmented-reality (AR) application.

The light-field generating device 1 proposed in the present invention can be used not only in a VR application as shown in FIG. 5, but also in an AR application as shown in FIG. 7. In FIG. 7, the present invention proposes the light-field generation device 1, which is a multi-display device for demonstrating near-eye AR and suitable for displaying near-eye light field. The light-field generating device 1 uses the eyepiece unit 2 as a light-field lens. This state-of-use is designed to use a 45-degree bidirectional dichroic flat glass 4 to reduce the aberration of on-axis and off-axis light rays.

Thus, the present invention designs a light-field generating device for near-eye viewing, which reduces existing human-eye vergence accommodation conflict (VAC). The present invention regards near-eye light-field display as a process of light-field reproduction. An eyepiece unit merges scenes outputted by the device and reduces aberration. By using eye models, the 3D perceptions of the light fields generated can be verified. The proposed device has been verified by adjusting the focal length of a camera, which proves it is possible to make AR free from VAC.

To sum up, the present invention is a light-field generating device, where a relay lens module is used to reproduce light field for a near-eye VR display device; an eyepiece unit is specially designed for a light-field generating device to fuse the light field captured by a camera array and minimize the aberrations of light rays inside and outside axis at the same time; and the proposed device has been verified by adjusting the focal length of a camera to prove the capability of avoiding the problem of human-eye VAC for realizing AR.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A light-field generating device displaying a near-eye light field and comprising:
   a display panel divided into a plurality of sub-areas, wherein said sub-areas display light-field subsets simultaneously and wherein each of said light field subsets corresponds to a different field angle;
   a projecting lens-array unit, wherein the light rays of a plurality of different scenes are emitted to a common diaphragm from said sub-areas of said display panel and collimated by said projecting lens-array;
   a fusion lens unit, wherein the light rays emitted from said projecting lens-array unit are focused on an imaging plane to form a real image; and
   an eyepiece unit, wherein the light rays forming said real image are collimated, and wherein the eyepiece unit includes a beam splitter or a prism with a multiple spectrum coating.

2. The device according to claim 1, wherein any one of said sub-areas of said display panel displays a designated one of said scenes on an imaging plane.

3. The device according to claim 2, wherein said scenes of said sub-areas of said display panel are displayed on said imaging plane and overlapped with each other.

4. The device according to claim 3, wherein, all said scenes displayed on said sub-areas of said display panel correspond to different field angles.

5. The device according to claim 1, wherein said fusion lens unit is a focusing lens unit; and said projecting lens-array unit is a collimating lens array; and wherein said collimating lens array comprises an array of collimating lenses; each of said collimating lenses comprises a plurality of lenses; and the number of said collimating lenses is related to the number of said sub-areas of said display panel.

6. The device according to claim 5, wherein a distance between a display panel and said collimating lens array and a distance between said collimating lens array and said focusing lens unit are related to a focal length of said collimating lens array and a focal length of said focusing lens unit.

7. The device according to claim 1, wherein an f-number obtained with said projecting lens-array unit and said fusion lens unit is between 2 and 10.

8. A light-field generating system comprising:
a laser beam scanner scanning a scanning plane into a plurality of sub-areas; wherein said sub-areas correspond to light-field subsets and wherein each of said light field subsets corresponds to a different field angle;
a projecting lens-array unit, wherein the light rays of a plurality of different scenes are emitted to a common diaphragm from said sub-areas of said scanning plane and collimated by said projecting lens-array;
a fusion lens unit, wherein light rays emitted from said projecting lens-array unit are focused on an imaging plane to form a real image, wherein light rays of said real image pass through an eyepiece unit to be displayed on retina and perceived as being obtained from an almost infinitely far-off place; and
an eyepiece unit, wherein the light rays forming said real image are collimated, and wherein the eyepiece unit includes a beam splitter or a prism with a multiple spectrum coating.

9. The device according to claim 8, wherein any one of said sub-areas of said laser beam scanner displays a designated one of said scenes on an imaging plane.

10. The device according to claim 9, wherein said scenes of said sub-areas of said laser beam scanner are displayed on said imaging plane and overlapped with each other.

11. The device according to claim 10, wherein all said scenes displayed on said sub-areas of said scanning plane correspond to different field angles.

12. The device according to claim 8, wherein said fusion lens unit is a focusing lens unit; and said projecting lens-array unit is a collimating lens array; and wherein said collimating lens array comprises an array of collimating lenses; each of said collimating lenses comprises a plurality of lenses; and the number of said collimating lenses is related to the number of said sub-areas of said laser beam scanner.

13. The device according to claim 12, wherein a distance between a scanning plane and said collimating lens array and a distance between said collimating lens array and said focusing lens unit are related to a focal length of said collimating lens array and a focal length of said focusing lens unit.

14. The device according to claim 8, wherein an f-number obtained with said projecting lens-array unit and said fusion lens unit is between 2 and 10.

15. A light-field generating system comprising:
a display panel divided into a plurality of sub-areas corresponding to different field angles, each of the sub-areas displaying a different one of a plurality of different scenes simultaneously, each scene corresponding to the respective field angle;
a projecting lens-array unit, wherein the light rays of a plurality of different scenes are collimated through the projecting lens-array from the sub-areas of the display panel;
a fusion lens unit receiving the plurality of different scenes from the projecting lens-array and overlapping the collimated different scenes to form a single three-dimensional real image at an imaging plane; and
an eyepiece unit emitting the three-dimensional real image onto a retina,
wherein the eyepiece unit includes a beam splitter or a prism with multiple spectrum coating.

* * * * *